H. SPRAGUE.
Carriage-Spring.
No. 8,461. Reissued Oct. 22, 1878.
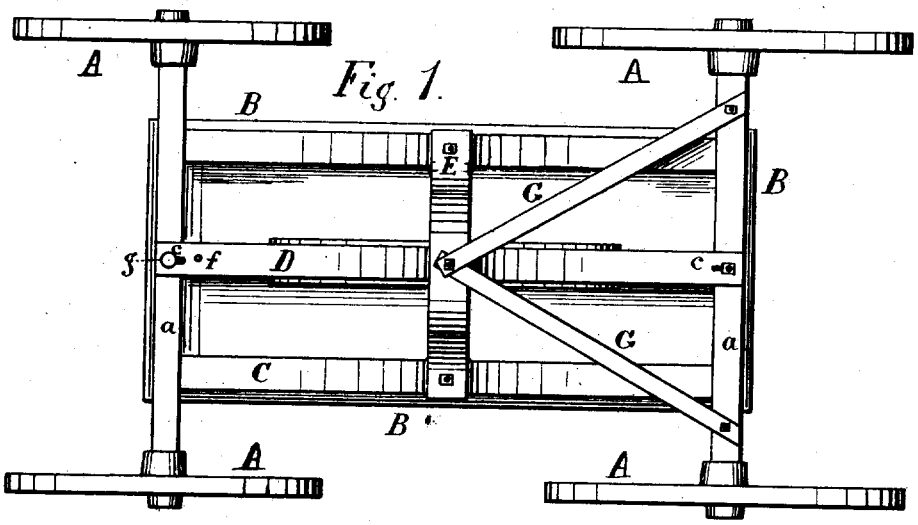
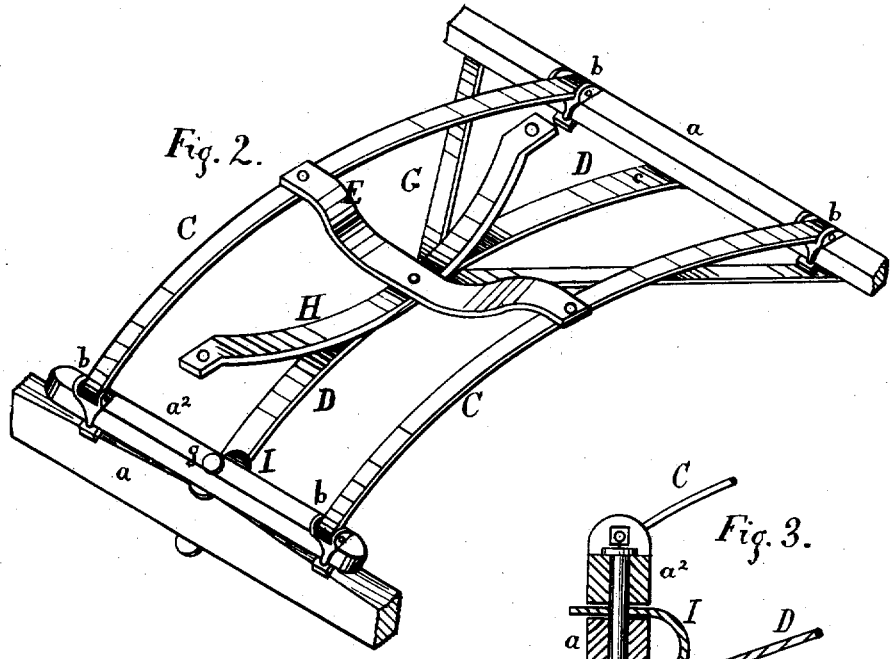
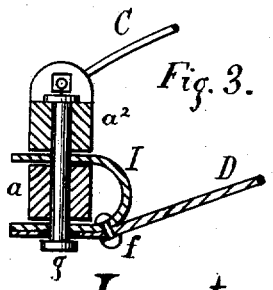
Witnesses:
Courtney A. Cooper
William Paxton
Inventor:
Harvey Sprague
Per, James Langster
Atty.
N. PETERS, PHOTO-LITHOGRAPHER, WASHINGTON, D. C.

UNITED STATES PATENT OFFICE.

HARVEY SPRAGUE, OF CHURCHVILLE, NEW YORK.

IMPROVEMENT IN CARRIAGE-SPRINGS.

Specification forming part of Letters Patent No. 163,112, dated May 11, 1875; Reissue No. 8,461, dated October 22, 1878; application filed October 7, 1878.

*To all whom it may concern:*

Be it known that I, HARVEY SPRAGUE, of Churchville, in the county of Monroe and State of New York, have invented a certain new and useful Improvement in Carriages and Wagons; and I do hereby declare that the following is a full, clear, and exact description of the construction and operation of the same, reference being had to the accompanying drawings, in which—

Figure 1 is a plan of a wagon inverted or turned bottom upward, and provided with my improvement. Fig. 2 is a perspective view of the reach and springs and connecting parts, right side up. Fig. 3 is a cross-section of the bolster and front axle in line of the king-bolt.

My improvement is of that class in which the front and rear axles are connected by a spring-arch and a rigid reach is avoided.

The invention consists in the arrangement of the side springs, reach, cross-strap, body-loop, and braces, and also in the employment of a circle-plate of peculiar construction, as hereinafter described.

A A represent the wheels. *a a* are the front and rear axles, and $a^2$ is the bolster. B is the wagon-body. These parts are of ordinary construction. C C are two side springs, pivoted at *b b* to clips on the top or sides of the rear axle and front bolster, and supporting the wagon-body by being attached to side blocks projecting down from the wagon-body. They are made arched or convex, and may be composed of several leaves, to give proper thickness and strength.

D is a spring-reach, of the same curvature as the side springs, and lying centrally between them. Its ends are slotted longitudinally, as shown at *c c*, and are attached on the under side of the front and rear axles by bolts or T-clips, which pass through the slots *c c*. The reach lies as much lower than the side springs as the distance between the end attachments of said parts.

E is a central cross-strap, bolted fast at the ends to the springs C C, and in the center to the reach D. In order to meet the points of attachment, it is made concave or curved, as shown in Fig. 2.

G G are two rear braces, bolted fast to the center of the reach, and extending backward and outward in an angular direction, and bolted fast to the bottom of the rear axle, near the ends, the two being thus in the form of a V, as shown in Fig. 1.

In attaching the braces G G, the rear ends are first secured to the axle, and the front ends are then sprung up to rest against the reach. By this means, when the weight is applied upon the springs to depress them, the braces will prevent rolling or turning of the axle, as they expand under depression to the same degree that the springs and reach do, thereby balancing the axle.

H is a body-loop, bolted fast to the center of the reach, and curved upward and attached at the ends to the bottom of the wagon-body longitudinally. The wagon-body, therefore, has four attachments—viz., to the ends of the body-loop longitudinally, and to the center of the side springs transversely.

The object of the cross-strap E, angular braces G G, and body-loop H, as combined with the side springs and reach, is to give strength and position to the wagon-body, and prevent tilting or depression out of the horizontal line when preponderance of weight is applied at either side, or either end. The function of the cross-brace E is to connect the body, the side springs, and the reach together, so that the latter assist each other in resisting vertical or lateral motions of the body—a result which is not accomplished when the reach is connected with the body by an upright brace.

When weight is applied on one side, the thrust transversely is taken by the cross-strap E and transferred across to the opposite angular brace G, and expended upon the farther end of the rear axle, the cross-strap and brace, although not in a straight line, approximating sufficiently thereto for this purpose, and the effect in preventing tipping or tilting being better than where the rear braces are carried back longitudinally in line with the reach and springs, and at right angles to the cross-strap, as in other wagons of this class. The cross-strap and angular braces also prevent torsion of the reach. So long as such torsion is prevented the wagon-body cannot sag on one side more than on the other.

When undue weight is applied on one end or the other, the longitudinal tipping is prevented, by reason of the attachment of the body to the springs and reach being in a central transverse line. The body-loop H in that case serves as a brace to carry the strain to the center only, and since there is no stiff connection between the front and rear axles, the wheels can spread longitudinally, and the springs will depress equally throughout their whole length. There will be no appreciable tipping unless the weight is in excess of the capacity of the springs.

Another advantage of my invention consists of the arrangement whereby the axle and bolster are prevented from rolling or turning as the springs are depressed. The two side springs being attached on top or at the side, and the reach and angular braces on the bottom, they expand equally when depressed, thereby balancing the axles. This effect is further produced by pivoting the ends of the springs, instead of attaching them rigidly, which has been heretofore done, and in forming the slots *c c* in the reach, so that no binding or strain can occur. The effect of holding the axles balanced is further produced by the body-loop H, which prevents any end-play or "shucking" of the wagon in one direction or the other by jerks.

I is the circle-plate, which is in the form of a loop, and embraces the front axle. The end of the reach is attached to the loop by a rivet, *f*, in the rear of the king-bolt *g*. The king-bolt passes through the bolster and axle in the usual manner, and also through the ends of the circle-plate. The slot *c* in the end of the reach is of such size that the end of the reach cannot come in contact with the king-bolt at any time.

When the draft is applied to the wagon the strain comes upon the upper end of the king-bolt and upon the rivet *f*, and not upon the end of the reach. By this means I obviate wear upon the end of the reach, and avoid the necessity of making it thicker and stronger than the body of the reach itself.

The construction of the springs above described makes them very light, strong, and so elastic as to break all shocks which occur by striking the wheels on obstructions.

Having thus described my invention, I do not claim, broadly, side springs, nor a spring-reach. Neither do I claim, broadly, connecting the front and rear axles with a spring-arch without a rigid reach; but

What I claim as new is—

1. The combination of the wagon-body B, side springs C C, spring-reach D, and the cross-strap E, substantially as described.

2. The combination of the side springs C C, spring-reach D, cross-strap E, body-loop H, and the angular braces G G, extending from the reach to the outer ends of the rear axle, substantially as and for the purposes set forth.

3. The combination, with the springs C C and spring-reach D, of the cross-strap E and the angular braces G G, substantially as set forth.

4. The combination of the pivoted side springs C C, the reach D, attached below the axles, and the body-loop H, fastened to the reach, operating substantially as and for the purposes set forth.

HARVEY SPRAGUE.

Witnesses:
MILTON R. MAXSON,
ARTHUR R. SELDEN.